[12] United States Patent  
Betty et al.

(10) Patent No.: US 6,973,232 B2  
(45) Date of Patent: Dec. 6, 2005

(54) WAVEGUIDE MODE STRIPPER FOR INTEGRATED OPTICAL COMPONENTS

(75) Inventors: Ian B. Betty, Ottawa (CA); Maxime Poirier, Hull (CA)

(73) Assignee: Bookham Technology, plc, Towcester (GB)

( * ) Notice: Subject to any disclaimer, the term of this patent is extended or adjusted under 35 U.S.C. 154(b) by 201 days.

(21) Appl. No.: 10/073,101

(22) Filed: Feb. 12, 2002

(65) Prior Publication Data

US 2003/0152324 A1 Aug. 14, 2003

(51) Int. Cl.[7] .......................... G02B 6/12; G02B 6/14; G02B 6/24; G02B 6/42

(52) U.S. Cl. .......................... 385/29; 385/14; 385/15; 385/27; 385/39; 385/40

(58) Field of Search .......................... 395/14, 15, 27, 395/29, 39, 40

(56) References Cited

U.S. PATENT DOCUMENTS

| | | | |
|---|---|---|---|
| 5,444,803 A | | 8/1995 | Kim et al. .................. 385/28 |
| 6,111,998 A | * | 8/2000 | Ido et al. .................. 385/29 |
| 6,148,132 A | * | 11/2000 | Hamamoto .................. 385/131 |
| 6,571,038 B1 | * | 5/2003 | Joyner et al. .................. 385/40 |
| 6,668,103 B2 | * | 12/2003 | Hosoi .................. 385/2 |
| 2003/0021514 A1 | * | 1/2003 | Ito et al. .................. 385/11 |
| 2003/0113063 A1 | * | 6/2003 | Liu .................. 385/28 |

FOREIGN PATENT DOCUMENTS

EP 0 881 512 A2 12/1998  
WO WO02/31587 A2 10/2001

OTHER PUBLICATIONS

Hamamoto, K. et al "Active multi-mode-interferometer semiconductor optical amplifier" Electronics Letters, Jul. 6, 2000 vol. 36 No. 14 pp 1218-1220.*  
Bernard, Jean-Jacques, et al., "Semiconductor Optical Amplifiers", spie's oemagazine, Sep. 2001, pp 36-38.  
Eldada, Louay, "Telecom Integrated Optic Components and Subsystems", Telephotonics Inc., http://www.cir-optical.com/CIROpticspapers.htm, reflecting information known at least as early as Oct. 29, 2001, 8 pages.  
Jalali, B., et al., "Advances in Silicon-on-Insulator Optoelectronics", IEEE Journal of Selected Topics in Quantum Electronics, vol. 4, No. 6, Nov./Dec. 1998, pp 938-947.

(Continued)

Primary Examiner—Edward J. Glick  
Assistant Examiner—Krystyna Suchecki  
(74) Attorney, Agent, or Firm—Lahive & Cockfield, LLP; Anthony A. Laurentano, Esq.

(57) ABSTRACT

Through the introduction of an imaging multimode interference device in an integrated optical circuit, such performance degradations as lateral waveguide field oscillations and backreflections may be suppressed. The suppression of lateral waveguide field oscillations (that may occur due to misaligned optical coupling), in particular, can significantly reduce variations in the power splitting ratio of an optical power splitting structure, such as those employed by a Mach-Zehnder modulator.

8 Claims, 9 Drawing Sheets

OTHER PUBLICATIONS

Kim, H.S., et al. "Square Ring Laser Diode with MMI Coupler Cavity", IEEE Photonics Technology Letters, vol. 9, No. 5, May 1997, pp 584-586.

Kudo, Koji, et al., "1.55-μm Wavelength-Selectable Microarray DFB-LD's with Integrated MMI Combiner, SOA, and EA-Modulator", IEEE Photon. Techn. Lett. 242, Mar. 2000, pp 190-192.

Leuthold, J., et al., "Spatial Mode Filters Realized with Multimode Interference Couplers", Optics Letters, vol. 21, No. 11, Jun. 1, 1996, pp 836-838.

Pennings, E.C.M., et al., "Reflection Properties of Multimode Interference Devices", IEEE Photonics Technology Letters, vol. 6, No. 6, Jun. 1994, pp 715-718.

Soldano, Lucas, B., et al., "Optical Multi-Mode Interference Devices Based on Self-Imaging: Principles and Applications", Journal of Lightwave Technology, vol. 13, No. 4, Apr. 1995, pp 615-627.

Uemukai, M., et al., "Tunable External-Cavity Semiconductor Laser Using Monolithically Integrated Tapered Amplifier and Grating Coupler for Collimation", IEEE Photonics Technology Letters, vol. 12, No. 12, Dec. 2000, pp. 1607-1609.

van Dam, C.,et al., "Compact Spatial Mode Filter Based on a MMI Coupler", J.J.M. Annual Symposium-IEEE Leos Benelux Chapter 1996 $1^{st}$ , pp 112-115.

Jenkins, R.M., "A Novel Waveguide Mach-Zehnder Interferometer Based on Multimode Interference Phenomena," Optics Communications 110 (1994) pp. 410-424.

Leuthold, J., "Spatial Mode Filters Realized with Multimode In terference Couplers," 1996 Optical Society of America, No. 11, Jun. 1, 1996, pp. 836-838.

* cited by examiner

WAVEGUIDE MODE STRIPPER FOR INTEGRATED OPTICAL COMPONENTS

FIELD OF THE INVENTION

The present invention relates to integrated optical components and, more specifically, to a waveguide mode stripper for integrated optical components.

BACKGROUND

As telecommunications and data communications increasingly adopt optical fiber as a preferred communication medium, integrated electrical components, generally present in communications equipment, are being replaced by equivalent integrated optical components, including waveguides, optical amplifiers, splitters, etc.

To pass from optical fiber to integrated optical components, an optical signal is first received by a waveguide, often formed in the same medium on which the integrated optical components have been formed. The optical signal carried by a waveguide can be said to have at least one "mode", where a mode is one of number of possible patterns of propagating or evanescent electromagnetic fields that maintain their transverse field distribution during propagation. Each mode is characterized by frequency, polarization, electric field strength and magnetic field strength. The electromagnetic field pattern of a mode depends on the frequency of the signal and refractive indices, dielectric constants and geometry of the waveguide.

Multimode Interference (MMI) devices rely on a self-imaging property of multimode waveguides. Self-imaging is the property by which an input field pattern is reproduced in single or multiple images at periodic intervals along the propagation direction of the waveguide. This self-imaging is a result of the (near quadratic) dependence of a propagation constant with the mode number.

An MMI coupler is an exemplary MMI device that consists of input waveguides and output waveguides separated by an MMI region. The MMI region supports a large number of modes that propagate with different phase velocities leading to periodic self-imaging. There may be multiple inputs to the MMI region and multiple outputs. The dimensions of the MMI region are selected based on the wavelength of the signal of interest and establish the nature of the optical signal on the outputs as a function of the signals on the inputs. For instance, an appropriately dimensioned MMI coupler may have a single input and divide the signal in that input such that the signal is split between two outputs.

MMI devices have become important components within the integrated optical circuits that require N×M power splitting structures, which distribute (not necessarily uniformly) the power of N inputs to M outputs. Exemplary integrated optical circuits that require power splitting structures include ring lasers, arrayed waveguide gratings, interferometric modulators and optical switches. A Mach-Zehnder modulator is another example of an integrated optical circuit that requires a splitting structure. The configuration of a power splitting structure in an interferometric modulator determines a power splitting ratio, where the power splitting ratio indicates a division of input power between a number of output powers, for instance, two output powers.

Like integrated electrical components, integrated optical components need to be coupled. However, unlike electrical components wherein electrical connections merely need to contact, when a fiber is coupled to a waveguide leading to integrated optical components, misalignments may occur. Misaligned optical coupling can excite modes other than the fundamental mode in the input waveguide of a power splitting structure, which can lead to variations in the power splitting ratio of the power splitting structure. Fixing this power splitting ratio is critical to the performance of interferometric modulators.

If the coupling between a fiber and a waveguide can be accomplished with sub-micron precision, the splitting ratio may be fixed, but such requirements lead to very small manufacturing tolerances.

While there are a few waveguides and splitter designs that allow fixed split ratios regardless of misalignment, if device requirements do not accommodate these designs, there is no known solution to the problem of the dependence of splitting ratios on misalignment.

An undesired power splitting ratio can degrade the device performance of a Mach-Zehnder or other interferometric modulator.

Where misalignments at the input to an integrated optical device are one problem, another problem arises at the output coupling between a waveguide and a fiber. Often a portion of the optical signal on the output waveguide of the optical component in question is reflected back at the optical component by the coupling between the output waveguide and the fiber. These reflections are generally called "back-reflections".

Commonly, these backreflections may be reduced by coating the facet of the output waveguide with an appropriate material. Although backreflections may be reduced by this method, the reduction may not be sufficient for some applications. Further, the accuracy with which the thickness of the coating must be applied requires very small tolerances to be observed and, even then, the effectiveness of the coating in reducing backreflections is very sensitive to variations in the wavelength of the signal to be reduced.

Another method of reducing backreflections involves angling the waveguide facets. However, this method may still not reduce backreflectivity enough for some applications, especially those applications that require waveguides with small fundamental mode field diameters or large refractive index step waveguides. Furthermore, angling waveguides leads to packaging complexity.

Clearly, there is a need to reduce the negative effect of the higher order modes present in a waveguide after a misaligned coupling. Further, it would be advantageous to find an alternative to current methods used to reduce backreflections.

SUMMARY

By stripping higher order modes from a signal input to a splitting structure, a mode stripper can significantly reduce variations in the power splitting ratio caused by misaligned optical couplings at the input to integrated optical components. The mode stripper can thus increase the packaging tolerances and performance of these integrated optical components. The mode stripper can also be used at the output of integrated optical components to reduce backreflections.

In accordance with an aspect of the present invention there is provided an integrated optical circuit including an input waveguide, an imaging multimode interference device adapted to substantially remove all modes but a fundamental mode of an optical signal received from the input waveguide and an optical power splitter structure in optical communication with the imaging multimode interference device.

In accordance with another aspect of the present invention there is provided a method for suppressing propagating lateral waveguide field oscillations at the input of an optical power splitter structure including fabricating an imaging multimode interference device in optical communication with the optical power splitter structure.

In accordance with a further aspect of the present invention there is provided an integrated optical circuit including an imaging multimode interference device in optical communication with an optical power splitting structure.

In accordance with an even further aspect of the present invention there is provided an integrated optical circuit including a semiconductor optical amplifier having an angled output and an imaging multimode interference device between the semiconductor optical amplifier and the angled output.

In accordance with a still further aspect of the present invention there is provided an integrated optical circuit including a waveguide device having an angled output and an imaging multimode interference device between the waveguide device and the angled output.

In accordance with an even further aspect of the present invention there is provided for use of an imaging multimode interference device as an optical mode stripper in an integrated optical circuit.

In accordance with a still further aspect of the present invention there is provided for use of an imaging multimode interference device to substantially remove all modes but a fundamental mode of an optical signal received at an input to the multimode interference device.

In accordance with an even further aspect of the present invention there is provided a semiconductor optical amplifier including an imaging multimode interference device adapted to substantially remove all modes but a fundamental mode of an optical signal received from an input waveguide and an electrode in contact with the multimode interference device adapted to change the optical properties of the multimode interference device through application of an electrical signal.

In accordance with a still further aspect of the present invention there is provided an optical attenuator including an input waveguide, an imaging multimode interference device adapted to substantially remove all modes but a fundamental mode of an optical signal received from the input waveguide and an electrode adapted to apply a bias voltage to a surface of the imaging multimode interference device.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention.

DETAILED DESCRIPTION

Figures 1A, 1B:
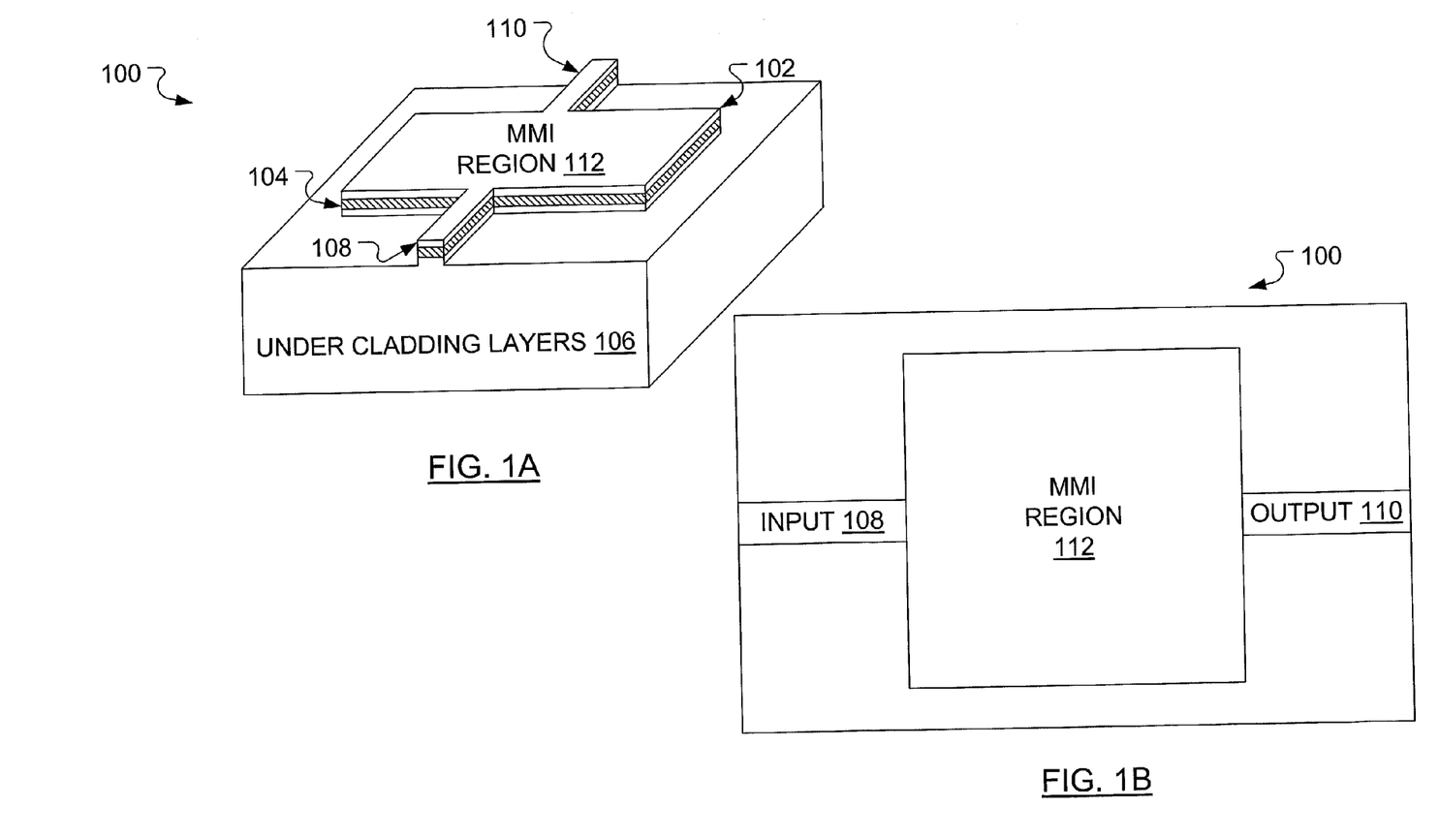
FIG. 1A illustrates a perspective view of a multimode interference device for use as a mode stripper according to an embodiment of the present invention.
FIG. 1B illustrates a top view of the mode stripper of FIG. 1 showing a basic structure for an MMI region.

FIG. 1A illustrates, in perspective, a strongly guided 1-to-1 imaging MMI device 100 for use as a mode stripper. It is noted that "1-to-1" means the device has one input and one output. To form the mode stripper 100, a structure is grown epitaxially and includes upper cladding layers 102, a core layer 104 and under cladding layers 106. The epitaxial structure is then etched, using a conventional photolithography process, to form an input waveguide 108, a multimode interference (MMI) region 112 and an output waveguide 110. A top view of the mode stripper 100 is presented in FIG. 1B.

Figures 1C, 1D:
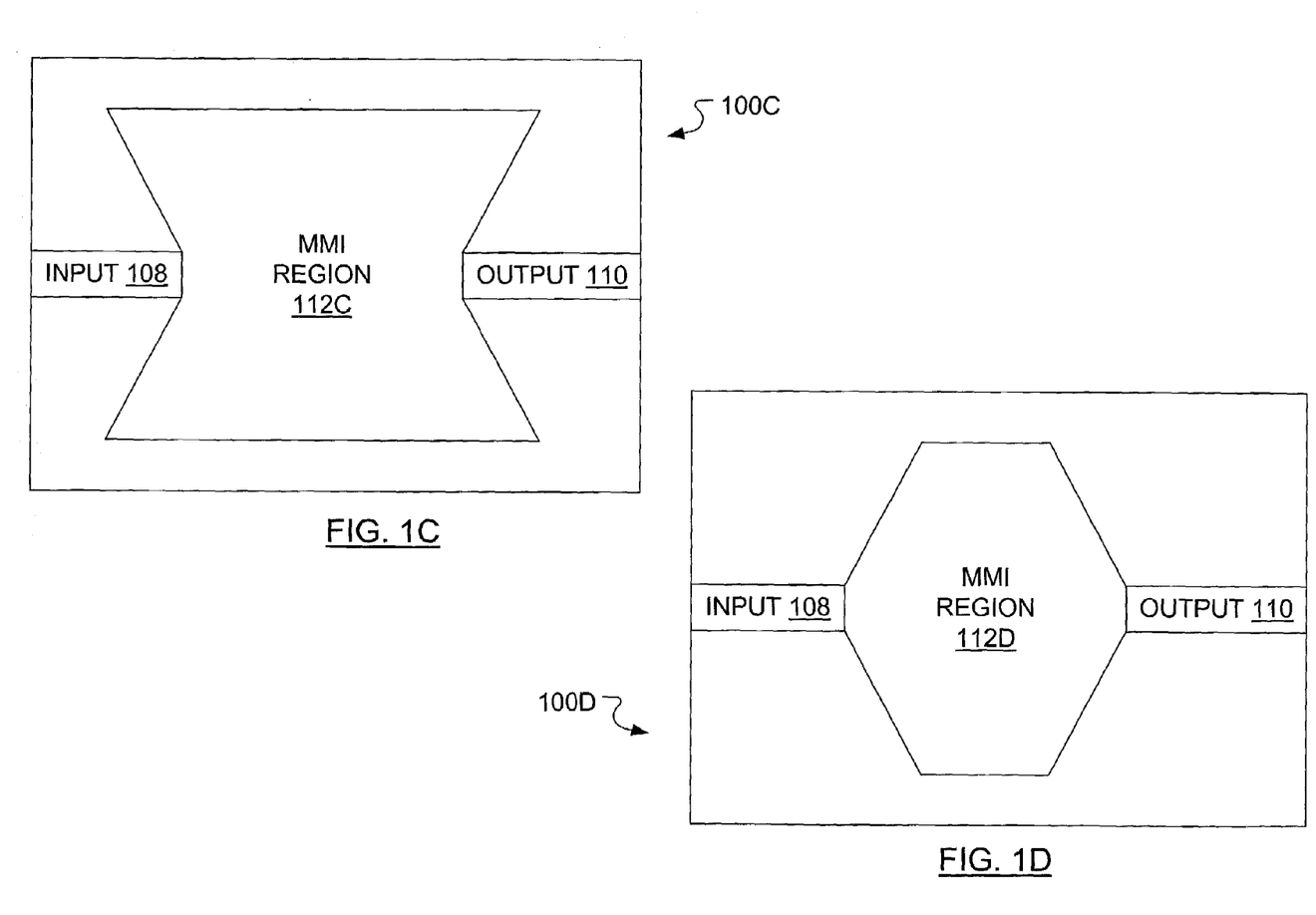
FIG. 1C illustrates a top view of a first alternate structure for the MMI region of the mode stripper of FIG. 1.
FIG. 1D illustrates a top view of a second alternate structure for the MMI region of the mode stripper of FIG. 1.

Additional shapes may be used for the MMI region 112, as illustrated as top views in FIGS. 1C and 1D. A first alternative mode stripper 100C, in FIG. 1C, has an MMI region 112C whose side structures are angled outwardly, while a second alternative mode stripper 100D, in FIG. 1D, has an MMI region 112D whose side structures are angled inwardly. The angled side structures of the MMI region 112C of FIG. 1C and the MMI region 112D of FIG. 1D may be used to reduce optical backreflections emanating from the mode stripper. As will be apparent to a person skilled in the art, combinations of the structures shown in FIGS. 1B, 1C and 1D are also possible.

As will be apparent to a person skilled in the art, the addition of an electrode to any of the MMI implementations illustrated in FIGS. 1B, 1C and 1D in combination with an appropriate epitaxial structure allows the resultant mode stripper to be used as an optical attenuator. Furthermore, the large area of the resultant device provides excellent thermal dissipation for absorbed power.

Subsequent figures generally illustrate a top view of various configurations of integrated optical components. Example materials used for fabricating such devices include InP, GaAs and LiNbO$_3$.

Figure 2A:
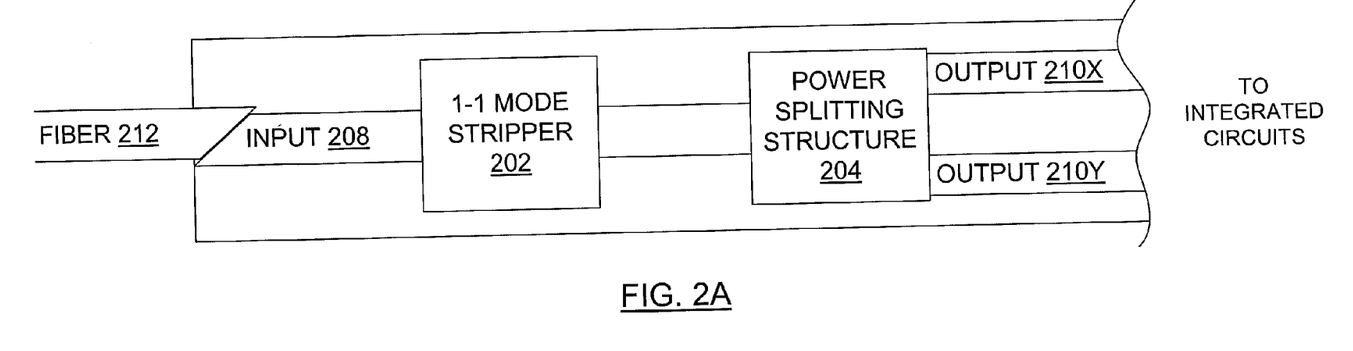
FIG. 2A illustrates a mode stripper in use according to a first embodiment of the present invention.

An integrated optical circuit is illustrated in FIG. 2A wherein a 1-to-1 imaging MMI device 202 is provided as mode stripper in series between a fiber 212 and a power splitting structure 204, which may be, for instance, a multimode interference (MMI) device, a directional coupler, a star coupler, etc. The fiber 212 supplies an optical signal to an input waveguide 208 from which the optical signal is passed to the mode stripper 202. The output of the power splitting structure 204 is split between a first output waveguide 210X and a second output waveguide 210Y. The optical signals on the first output waveguide 210X and the second output waveguide 210Y are carried to further integrated circuitry.

Figure 2B:
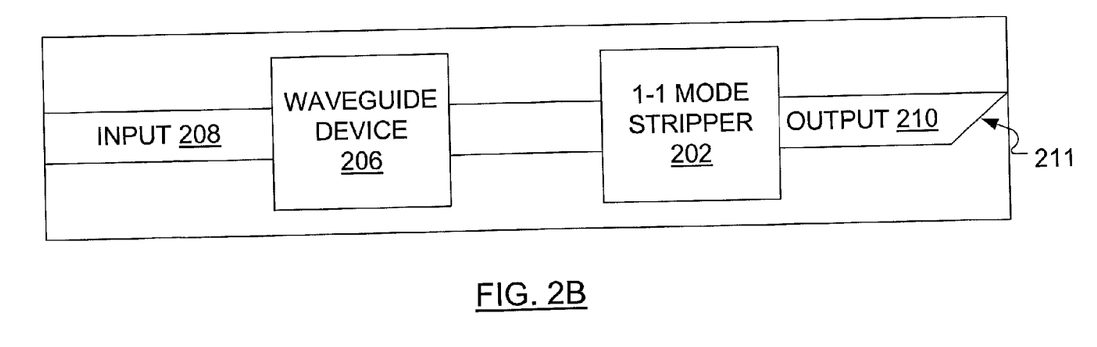
FIG. 2B illustrates a mode stripper in use according to a second embodiment of the present invention.

An alternate integrated optical circuit to that in FIG. 2A is illustrated in FIG. 2B wherein the mode stripper 202 is provided in series with and after a waveguide device 206, which may be, for instance, a Semiconductor Optical Amplifier (SOA), a Laser, etc. The output of the mode stripper 202 is carried on an output waveguide having an angled facet 211.

As will be apparent to a person skilled in the art, the MMI region of the mode stripper 202 of FIGS. 2A and 2B may have the structure of any one of the examples in FIGS. 1B, 1C or 1D or a combination thereof.

Figure 3:
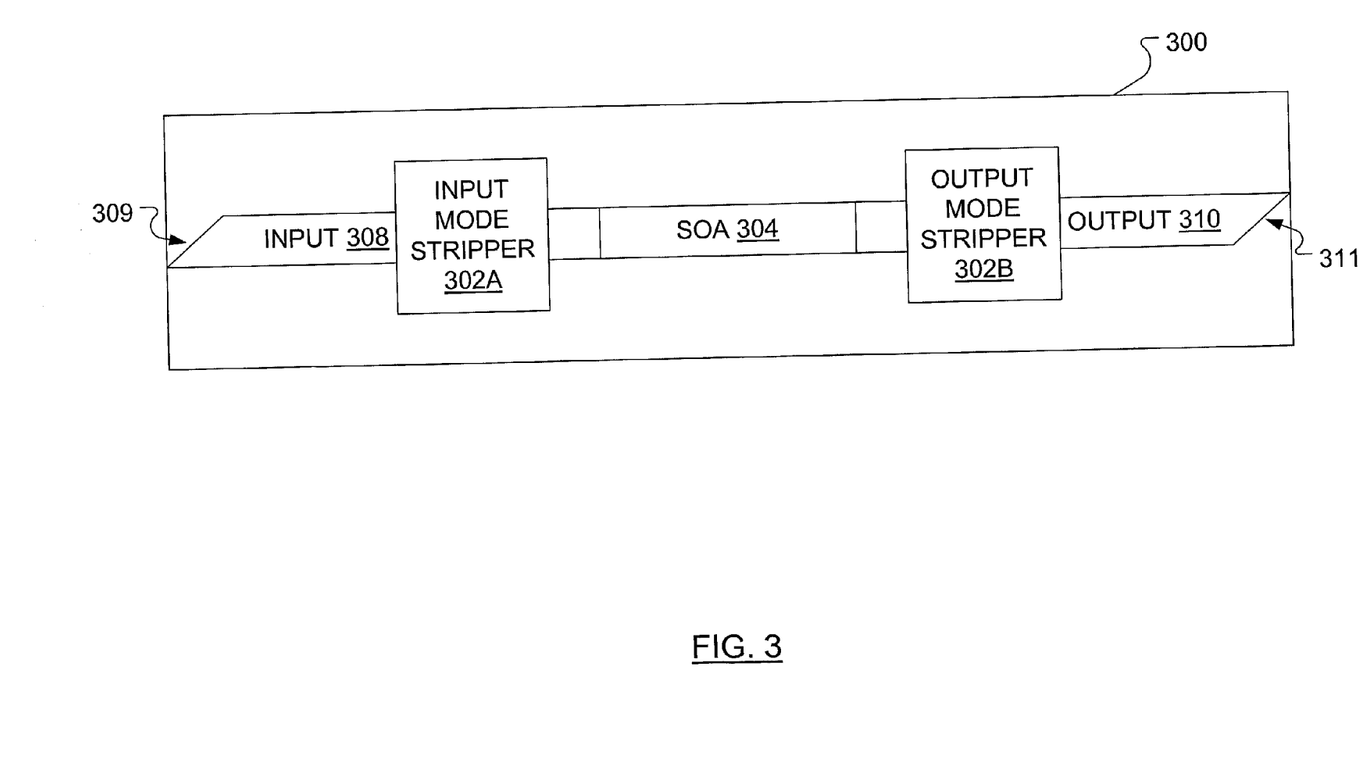
FIG. 3 illustrates a first exemplary integrated optical circuit wherein a mode stripper is provided on each side of a semiconductor optical amplifier according to an embodiment of the present invention.

A first exemplary integrated optical circuit 300 is illustrated in FIG. 3. The first exemplary integrated optical circuit 300 includes an SOA 304 and has an input waveguide 308 and an output waveguide 310. The input waveguide 308 has a coated and angled facet 309 and the output waveguide 310 has a coated and angled facet 311. An input mode stripper 302A is arranged in the input optical path to the SOA 304 and an output mode stripper 302B is arranged in the output optical path.

Figure 4:
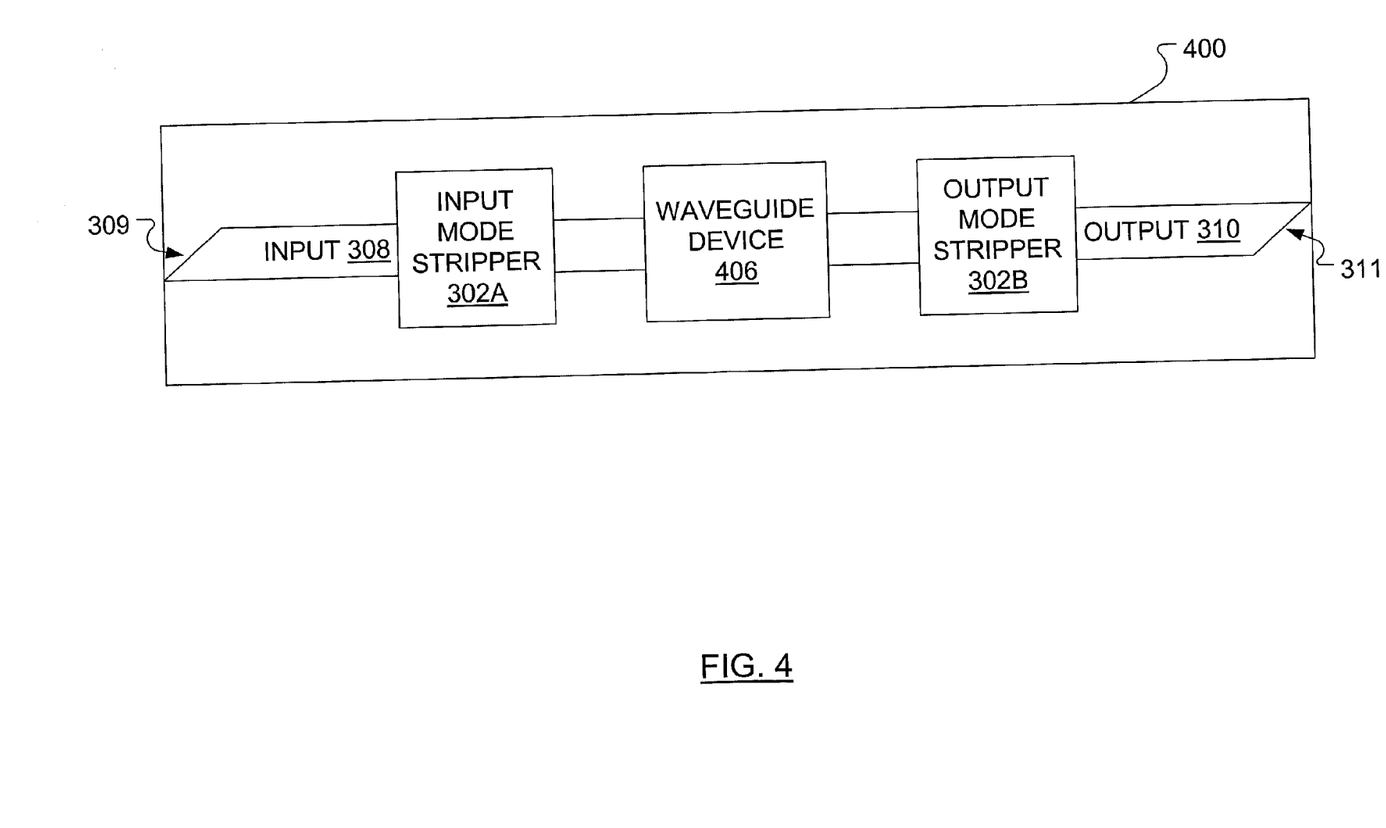
FIG. 4 illustrates a second exemplary integrated optical circuit wherein a mode stripper is provided on each side of an optical waveguide device according to an embodiment of the present invention.

A second exemplary integrated optical circuit 400 is illustrated in FIG. 4. The second exemplary integrated optical circuit 400 includes a waveguide device 406 in series with and interposed between the input waveguide 308 and the output waveguide 310 of FIG. 3, in place of the SOA 304.

Figure 5:
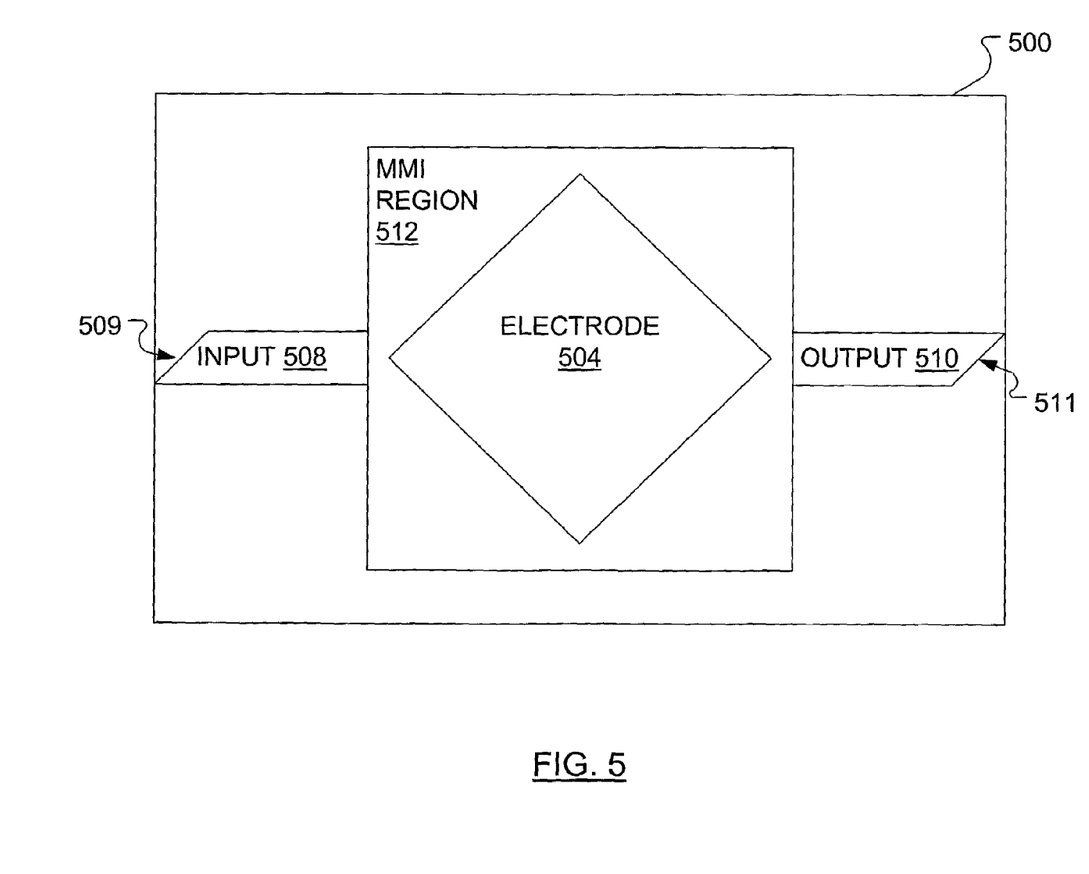
FIG. 5 illustrates a semiconductor optical amplifier combined with a mode stripper according to an embodiment of the present invention.

An SOA 500 is illustrated in FIG. 5 which includes a multimode interference (MMI) region 512 connected to an input waveguide 508 and an output waveguide 510. As is typical, the SOA 500 includes an electrode 504. The input waveguide 508 has a coated and angled facet 509 and the output waveguide 510 has a coated and angled facet 511. As will be apparent to a person skilled in the art, the MMI region 512 of the SOA 500 may have the structure of any one of the examples in FIGS. 1B, 1C or 1D or a combination thereof.

Figure 6:
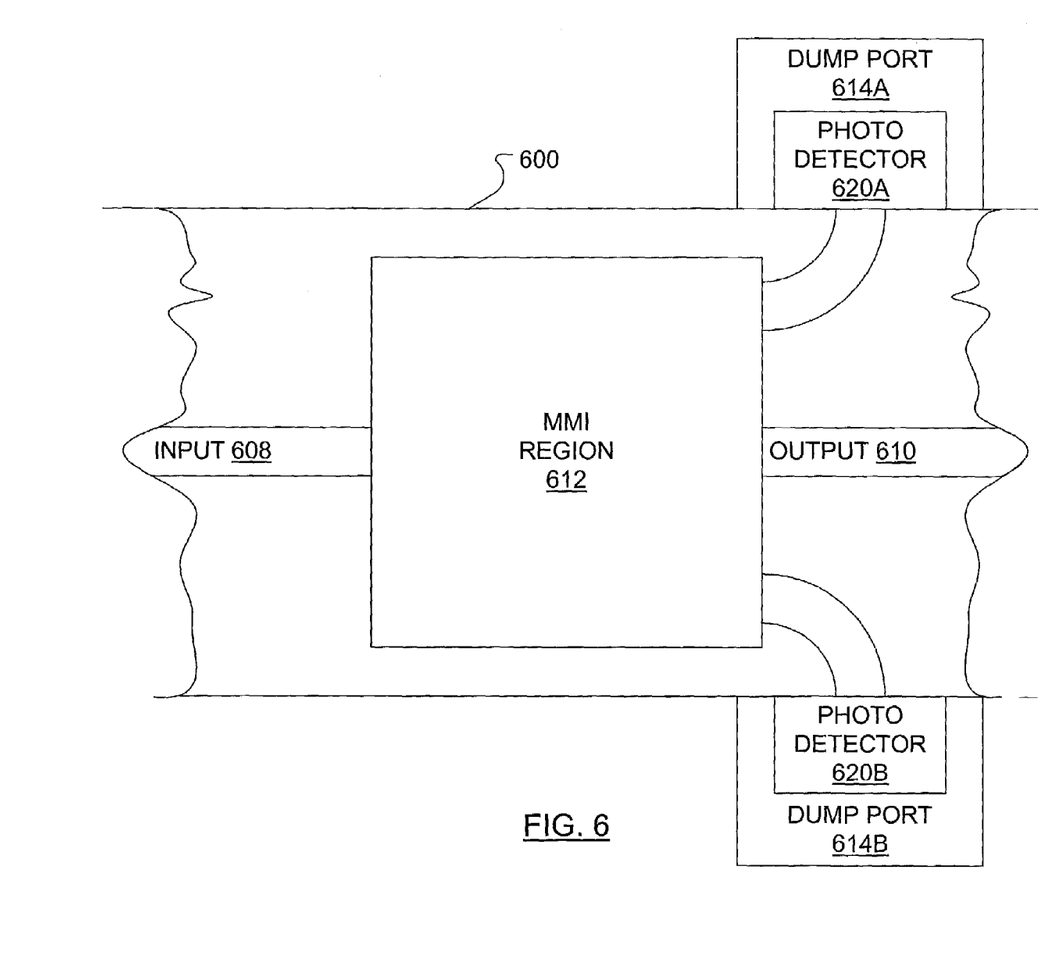
FIG. 6 illustrates an alternative configuration of a mode stripper according to an embodiment of the present invention.

A partial integrated optical circuit is illustrated in FIG. 6 to show an alternate configuration of a 1-to-1 imaging MMI device 600 as an alternate mode stripper. As may be seen to be typical given the configurations hereinbefore, the alternate mode stripper 600 includes an MMI region 612 connected to an input waveguide 608 and an output waveguide 610. However, the alternate mode stripper 600 of FIG. 6 also includes two further waveguides on the output leading to a first dump port 614A and a second dump port 614B. Each of the dump ports 614A, 614B includes a respective photodetector 620A, 620B. As will be apparent to a person skilled in the art, the MMI region 612 of the alternate mode stripper 600 may have the structure of any one of the examples in FIGS. 1B, 1C or 1D or a combination thereof.

Figure 7:
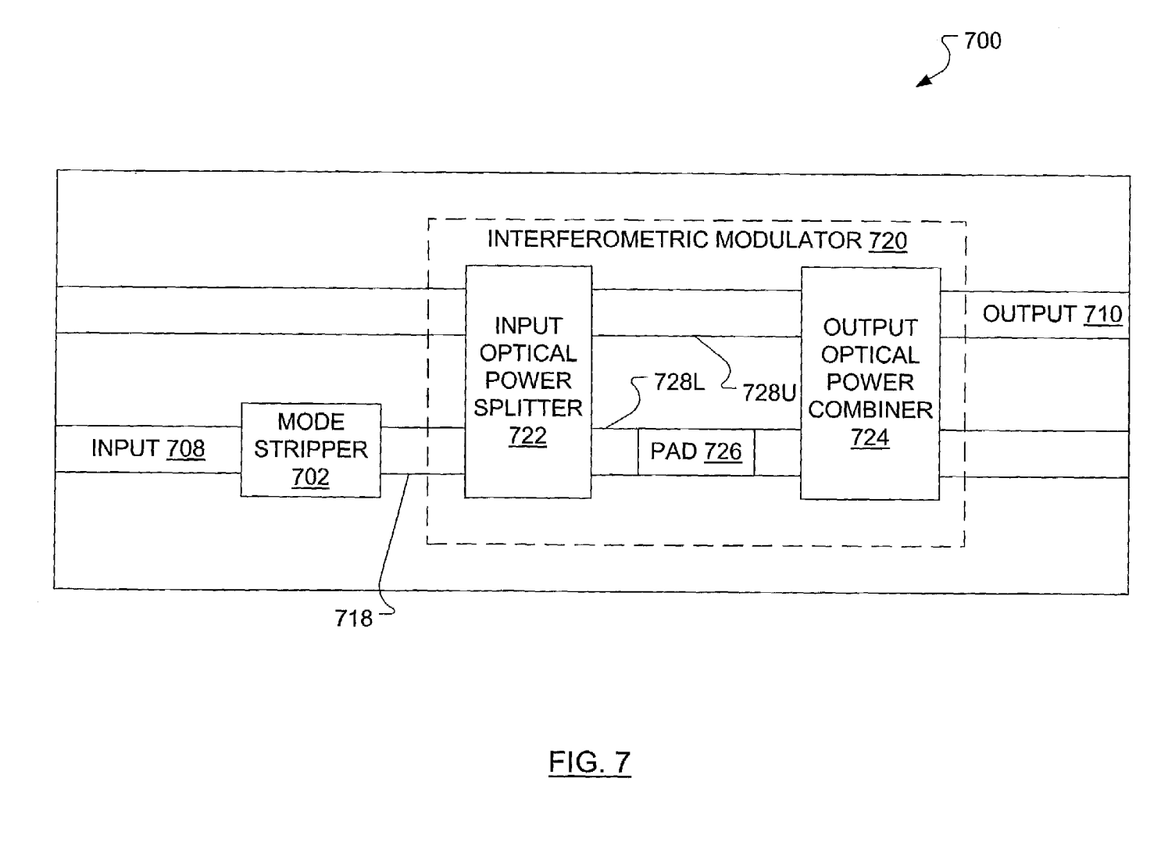
FIG. 7 illustrates an optical integrated circuit including a mode stripper and a interferometric modulator according to an embodiment of the present invention.

An exemplary optical integrated circuit 700 is illustrated in FIG. 7 including a 1-to-1 imaging MMI device 702 for use as a mode stripper and an interferometric modulator 720. The exemplary optical integrated circuit 700 further includes an input waveguide 708 that supplies an input signal to the mode stripper 702, an intermediate waveguide 718 leading from the mode stripper 702 to the interferometric modulator 720 and an output waveguide 710 for carrying an output signal from the interferometric modulator 720. The interferometric modulator 720 includes an input optical power splitter 722 connected to an output optical power combiner 724 by an upper waveguide 728U and a lower waveguide 728L. The lower waveguide 728L includes a phase altering device (PAD) 726. The PAD may be, for instance, a device whose index of refraction is alterable through the application of a voltage. Notably, the interferometric modulator 720 may be considered as the waveguide device 206 of FIG. 2 or the waveguide device 406 of FIG. 4. Furthermore, the input optical power splitter 722 and the output optical power combiner 724 have been illustrated as 2-to-2 devices. In other implementations of the interferometric modulator 720, the input optical power splitter 722 may be a 1-to-2 device. Additionally, the output optical power combiner 724 may be a 2-to-1 device.

The dimensions of the MMI region 112, 512, 712 in each of the above embodiments are selected, relative to the frequency of the input, so that the output of the MMI device is primarily the fundamental mode of the input signal.

In overview with reference to FIG. 2A, misalignments between fiber 212 and the input waveguide 208, which can excite higher order waveguide modes that may beat to cause lateral waveguide field oscillations, may be compensated for by stripping these higher order modes from a signal input to the power splitting structure 204. Thus, the mode stripper 202 (FIG. 2A) can significantly reduce or remove variations in the power splitting ratio of the power splitting structure 204. By choosing the dimensions of the mode stripper 202 appropriately, the image of the signal at the input that is available at the output may have only a fundamental mode. Fixing the power splitting ratio is critical to the performance of interferometric modulators. The mode stripper 202 can therefore increase the manufacturing tolerances of modulator devices or improve the modulator performance. Advantageously, reducing these lateral waveguide field oscillations will prevent an increase in crosstalk where the power splitting structure 204 is an optical switch.

In view of FIG. 2B, the mode stripper 202 is placed prior to the angled facet 211 of the waveguide device 206. The mode stripper 202 may, in this configuration, greatly reduce the higher order optical backreflections (both guided and radiation) that would otherwise return from the angled facet 211 to the waveguide device 206.

In particular, the dimensions of the mode stripper 202 may be selected so that the signal at the output is an image of the signal at the input and includes only the fundamental mode. Here, the terms "input" and "output" are used relative to the direction of the signal under consideration. For example, when considering backreflections in FIG. 2B, the direction of the backreflections is right to left, so the right side of the mode stripper 202 may be considered the input and the left side may be considered the output. As backreflections consist mainly of higher order modes, very little evidence of any backreflections that enter the right side may be seen at the left side.

This configuration could generally improve the usefulness of waveguides with angled facets in many strongly guided waveguide device. Exemplary strongly guided waveguide structures include modulators, mode converters and arrayed waveguide gratings (AWGs). Use of the mode stripper 202 is also applicable to buried or weakly guided waveguides.

A popular way to amplify optical signals involves the use of an Erbium Doped Fiber Amplifier (EDFA) wherein a section of fiber is doped with Erbium such that, when that section is pumped with an external radiation (light) source, the optical signal passing through the section is amplified. In contrast, a Semiconductor Optical Amplifier (SOA) involves an "active" section of semiconductor waveguide in contact with an electrode. Rather than pumping with light, as in the EDFA case, the electrode is electrically pumped with electrical energy such that an optical signal passing through the active section is amplified.

In FIG. 3, the input mode stripper 302A is arranged in series with the SOA 304 and the output mode stripper 302B. The input mode stripper 302A acts to reduce lateral waveguide field oscillations that may result from misaligned optical coupling. Both the input stripper 302A and the output mode stripper 302B act to reduce the backreflections that would otherwise be received from the angled facets 309, 311. Backreflections are a significant contributor to the noise figure (discussed hereinafter) of an SOA and must be carefully controlled.

Similarly, in FIG. 4, the input mode stripper 302A is arranged in series with the waveguide device 406 and the output mode stripper 302B. The input mode stripper 302A acts to reduce lateral waveguide field oscillations that may result from misaligned optical coupling. Both the input mode stripper 302A and the output mode stripper 302B act to reduce the backreflections that would otherwise be received from the angled facets 309, 311.

As illustrated in FIG. 5, the structure of a mode stripper and an SOA can be complementary. In the SOA 500 of FIG. 5, the MMI region 512, which might be considered part of a mode stripper, is the active section of the SOA 500. The electrode 504 may be electrically pumped to operate the SOA 500. The electrode 504 should be shaped to optimize the gain of the fundamental mode in the MMI region 512. Previous literature [inventor not certain of origin] has proposed a diamond as the optimal shape for the electrode 504 in other SOA applications. This SOA/MMI structure provides poor overlap between higher order mode reflections from the waveguide facets and the gain region.

Often a measure of the performance of an optical component, such as an SOA device, is given as a "noise figure", which is the ratio of the output signal-to-noise ratio of the SOA device to the input signal-to-noise ratio, assuming the input signal-to-noise ratio is shot noise limited.

Backreflections, in general, effect SOA noise figures and also may effect the linewidth of tuned, gain-controlled lasers. Where a mode stripper is placed prior to each of the angled and coated facets of a given device to reduce backreflections, the higher order modes reflected from the facets may be scattered by the mode stripper, thereby reducing feedback into the device. It has been found that reducing backreflections results in improved noise figures for SOAs in particular.

During the operation of the alternate mode stripper 600 of FIG. 6, the alternate mode stripper 600 acts to couple an optical signal, received from the input waveguide 608, to the output waveguide 610. Under normal operating conditions, the fundamental mode of the optical signal received from the input waveguide 608 passes through the MMI region 612 unimpeded, while the higher order radiation and guided modes are directed out the two dump ports 614A, 614B. Just as the placement of the output waveguide 610, is chosen to receive the fundamental mode of the input optical signal, the placement of the two dump ports 614A, 614B may be chosen for optimal coupling of higher order and radiation modes. The alternate mode stripper 600 may minimize backreflections, from facets beyond the output waveguide 610, in manner similar to the operation of mode strippers described hereinbefore. However, the overall size of the alternate mode stripper 600 is larger than the earlier described mode strippers such that the additional output waveguides may be accommodated. By receiving a signal from the photodetector 620A in the first dump port 614A and the photodetector 620B in the second dump port 614B, it is possible to monitor for changes in the device coupling over time and provide a feedback mechanism without tapping the primary signal emanating from the output waveguide 610.

The interferometric modulator 720 in the exemplary optical integrated circuit 700 illustrated in FIG. 7 typically operates as follows. The power in an input signal received on the intermediate waveguide 718 is split in a predetermined power splitting ratio by the input optical power splitter 722. At the output optical power combiner 724, signals received on each of the upper waveguide 728U and the lower waveguide 728L are combined to form an output on the output waveguide 710. Through the use of the PAD 726, the signals in the upper waveguide 728U and the lower waveguide 728L may arrive at the output optical power combiner 724 out of phase with each other. The power in the output signal on the output waveguide 710 is dependent upon the degree to which the signals are out of phase. By controlling the PAD 726 with a modulating signal, the output may be modulated with the modulating signal.

Predictable operation of the interferometric modulator 720 depends upon fixing the power splitting ratio in the input optical power splitter 722. For this reason, the mode stripper 702 is introduced in advance of the interferometric modulator 720. By stripping any higher order modes that can cause lateral waveguide field oscillations in an input signal after a misaligned coupling to the input waveguide 708, the mode stripper 702 improves the performance of the interferometric modulator 720.

Figure 8:
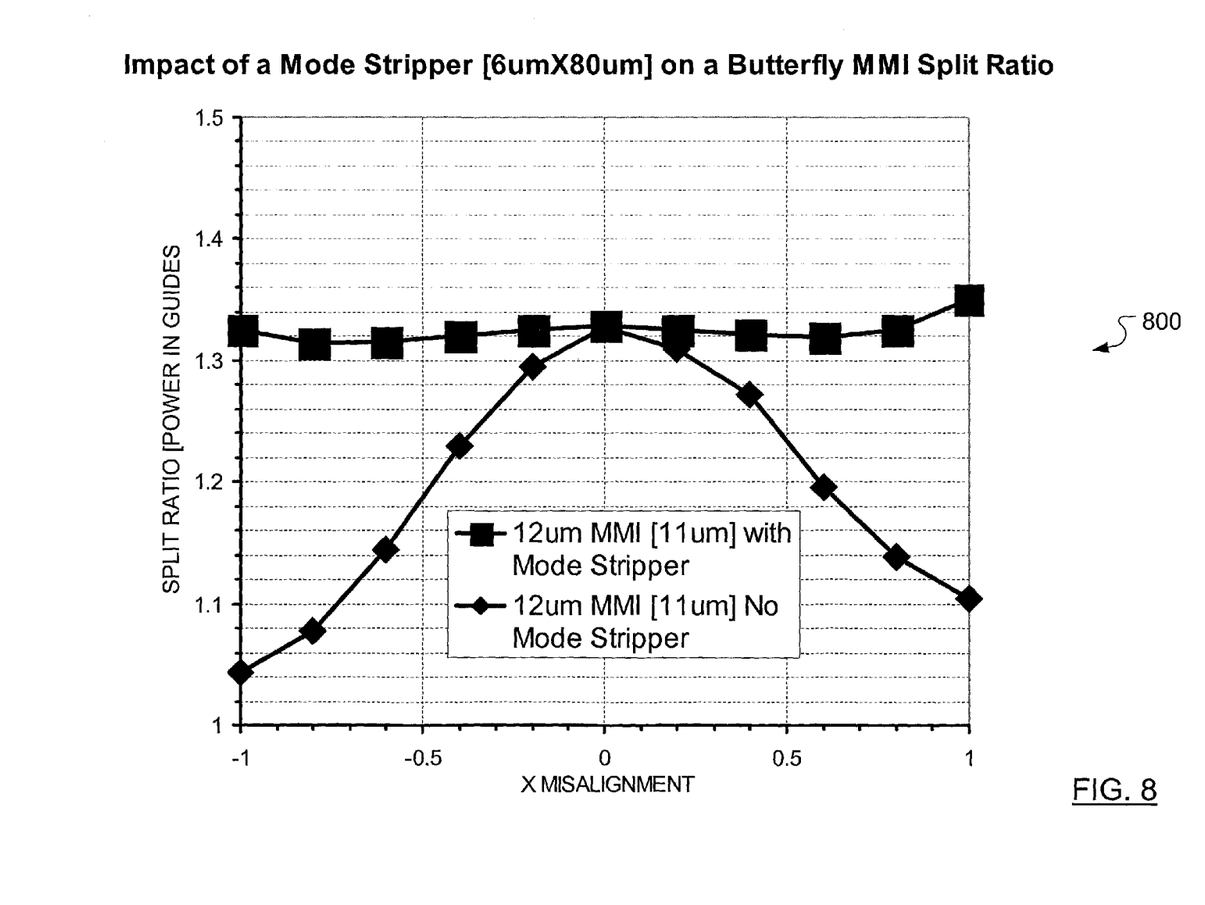
FIG. 8 illustrates the impact of an embodiment of the present invention on a the Split Ratio of a Butterfly MMI.

FIG. 8 illustrates the impact of an embodiment of the present invention on the split ratio of a Butterfly MMI. In particular, a mode stripper having dimensions of 6 μm by 80 μm is used. The split ratio is plotted, in a graph 800, for the Butterfly MMI with and without the mode stripper over a number of values of misalignment. Clearly, the addition of the mode stripper significantly reduces the effect of misalignment on the split ratio.

Other modifications will be apparent to those skilled in the art and, therefore, the invention is defined in the claims.

We claim:

1. An integrated optical circuit comprising:
   an input waveguide;
   an imaging multimode interference device adapted to substantially remove all modes but a fundamental mode of an optical signal received from said input waveguide; and
   an optical power splitter structure in optical communication with said imaging multimode interference device;
   wherein said multimode interference device includes a primary output in optical communication with said optical power splitter structure and a secondary output in optical communication with a dump port.

2. The optical circuit of claim 1, wherein said multimode interference device includes two said secondary output, of which is in optical communication with a respective said dump port.

3. A method for suppressing propagating lateral waveguide field oscillations at the input of an optical power splitter structure comprising,
   fabricating an imaging multimode interference device in optical communication with said optical power splitter structure, wherein said multimode interference device includes a primary output in optical communication with said optical power splitter structure and a secondary output in optical communication with a dump port; and receiving an error signal from said dump port and monitoring said error signal for a substantial change.

4. The method of claim 3 wherein said optical power splitter structure is a component of a interferometric modulator.

5. The method of claim 4 wherein said interferometric modulator is a Mach-Zehnder modulator.

6. The method of claim 3, wherein said multimode interference device includes two said secondary output, each of which is in optical communication with a respective said dump port, said method further comprising receiving an error signal from each of said dump ports and monitoring said error signal for a substantial change.

7. An integrated optical circuit comprising:
   a waveguide device;
   an angle output, the angle of which is non-perpendicular with respect to the direction of optical propagation;
   an imaging multimode interference device between said waveguide device and said angle output; and
   an angled input, the angle of which is non-perpendicular with respect to the direction of multimode interference device and said integrated optical circuit further comprises a second imaging multimode interference device between said wave guide device and said angled input, the first and second imaging multimode interference device adapted to substantially remove all modes but a fundamental mode of an optical signal received by the devices.

8. The integrated optical circuit of claim 7 wherein the waveguide device comprises a semiconductor optical amplifier.

* * * * *